US011329348B2

(12) United States Patent
Cho et al.

(10) Patent No.: US 11,329,348 B2
(45) Date of Patent: May 10, 2022

(54) CYLINDRICAL BATTERY CELL COMPRISING METAL CAN HAVING GROOVE

(71) Applicant: LG Chem, Ltd., Daejeon (KR)

(72) Inventors: Minsu Cho, Daejeon (KR); Sang-Uck Kim, Daejeon (KR); YounJoong Kim, Daejeon (KR); Sunghae Park, Daejeon (KR)

(73) Assignee: LG Energy Solution, Ltd.

( * ) Notice: Subject to any disclaimer, the term of this patent is extended or adjusted under 35 U.S.C. 154(b) by 473 days.

(21) Appl. No.: 15/717,217

(22) Filed: Sep. 27, 2017

(65) Prior Publication Data

US 2018/0097215 A1    Apr. 5, 2018

(30) Foreign Application Priority Data

Sep. 30, 2016  (KR) .......................... 10-2016-0126216

(51) Int. Cl.
*H01M 50/107* (2021.01)
*H01M 50/152* (2021.01)
(Continued)

(52) U.S. Cl.
CPC ....... *H01M 50/40* (2021.01); *H01M 10/0422* (2013.01); *H01M 50/107* (2021.01);
(Continued)

(58) Field of Classification Search
None
See application file for complete search history.

(56) References Cited

U.S. PATENT DOCUMENTS 5,725,967 A * 3/1998 Tuttle .................. H01M 50/116
429/185
7,887,950 B2   2/2011 Kim et al.
(Continued)

FOREIGN PATENT DOCUMENTS

KR   10-2007-0006248 A   1/2007
KR   10-2007-0007537 A   1/2007
(Continued)

OTHER PUBLICATIONS

English translation of KR 2007/0006248 (Year: 2007).*

*Primary Examiner* — Yoshitoshi Takeuchi
(74) *Attorney, Agent, or Firm* — Lerner, David, Littenberg, Krumholz & Mentlik, LLP

(57) ABSTRACT

A cylindrical battery cell includes an electrode assembly of a cathode/separator/anode structure and an electrolyte disposed in a battery case, a cylindrical metal container forms the battery case with the electrode assembly and the electrolyte disposed therein, a cap assembly is mounted on the open upper end of the metal container and a gasket of an elastic material is interposed between the metal container and the cap assembly. The upper end of the metal container is clamped and bent inward toward the central axis of the battery cell to enable the upper portion of the metal container to surround the exterior surface of the gasket. A recessed groove configured to partially receive the gasket by clamping, is formed on the interior surface of the inward-bent portion of the metal container. Accordingly, damage to the gasket interposed between the metal container and the cap assembly is reduced and inhibits electrolyte leakage.

20 Claims, 9 Drawing Sheets

(51) Int. Cl.
*H01M 50/171* (2021.01)
*H01M 50/166* (2021.01)
*H01M 50/40* (2021.01)
*H01M 10/04* (2006.01)
*H01M 50/116* (2021.01)
*H01M 50/213* (2021.01)

(52) U.S. Cl.
CPC ....... *H01M 50/116* (2021.01); *H01M 50/166* (2021.01); *H01M 50/171* (2021.01); *H01M 50/213* (2021.01)

(56) References Cited

U.S. PATENT DOCUMENTS

| 8,663,837 | B2 | 3/2014 | Oh et al. | |
|---|---|---|---|---|
| 2012/0028090 | A1* | 2/2012 | Kyung-Su | H01M 50/166 429/82 |
| 2012/0094169 | A1* | 4/2012 | Kim | H01M 50/116 429/164 |

FOREIGN PATENT DOCUMENTS

| KR | 20070006248 | * | 1/2007 | ............. H01M 2/08 |
|---|---|---|---|---|
| KR | 20070006248 | * | 7/2007 | ............. H01M 2/08 |
| KR | 10-0865405 | B1 | 10/2008 | |
| KR | 20110029061 | A | 3/2011 | |
| KR | 10-2012-0047114 | A | 5/2012 | |
| KR | 20160015778 | A | 2/2016 | |

* cited by examiner

CYLINDRICAL BATTERY CELL COMPRISING METAL CAN HAVING GROOVE

CROSS-REFERENCE TO RELATED APPLICATION

This application claims priority to and the benefit of Korean Patent Application No. 10-2016-0126216, filed on Sep. 30, 2016, the disclosure of which is incorporated herein by reference in its entirety.

TECHNICAL FIELD

The present disclosure relates to a cylindrical battery cell and more particularity, to a cylindrical battery cell that includes a metal container having a recessed groove formed on the interior surface of the metal container which prevents deterioration of the characteristics of the secondary battery.

RELATED ART

Recently, energy prices have increased due to the depletion of fossil fuels. Additionally, concerns regarding environmental pollution have increased and in turn the demand for environmentally-friendly alternative energy sources has increased. Accordingly, research has increased into techniques for various alternative power generation techniques, such as nuclear energy, solar energy, wind power, and tidal power and power storage apparatuses for more efficient use of the generated energy. In particular, the demand for secondary batteries as energy sources is rapidly increasing as mobile device technology continues to develop and the demand for the mobile devices continues to increase.

Generally, a primary battery is not designed to be rechargeable and a secondary battery is designed to be recharged. The secondary battery and has a wide range of applications, for example, electronic devices including mobile lap-top computers and camcorders, electric vehicles, and the like. In particular, a lithium secondary battery has a capacity about three times greater than a nickel-cadmium battery or a nickel metal hydride battery which are widely used as a power source of electronic equipment, as well as an increased energy density per unit weight, and of its current utilization is rapidly increasing.

Typically, secondary batteries are classified into a cylindrical battery that is configured to an electrode assembly mounted in a cylindrical metal container, a prismatic battery that is configured to have an electrode assembly mounted in a prismatic metal container, and a pouch-shaped battery that is configured to have an electrode assembly mounted in a pouch-shaped case made of an aluminum laminate sheet, according to the shape of the battery case.

Additionally, secondary batteries are classified based on the structure of an electrode assembly having a structure in which a cathode and an anode are stacked in a state in which a separator is interposed between the cathode and the anode. For example, the electrode assembly may be configured to have layer spiral arrangement (e.g., a jelly-roll (wound)) type structure. In other words, long sheet type cathodes and long sheet type anodes are wound in a state in which separators are disposed respectively between the cathodes and the anodes or a stacked type structure in which pluralities of cathodes and anodes each having a predetermined size are sequentially stacked in a state in which separators are disposed respectively between the cathodes and the anodes.

Recently, to reduce reliance on the layered spiral arrangement type electrode assembly and the stacked type electrode assembly, a stacked/folded type electrode assembly has been developed. In other words, a combination of the layered spiral arrangement type electrode assembly and the stacked type electrode assembly has been developed that has an improved structure in which predetermined numbers of of cathodes and anodes are sequentially stacked and separators are disposed respectively between the cathodes and the anodes to constitute a unit cell. Then a plurality of unit cells are sequentially folded while being placed on a separation Among them, the layered spiral arrangement type electrode assembly is widely used since the layered spiral arrangement type electrode assembly is advantageous because of its ease of production, high energy density per weight and ease of accommodation in a cylindrical secondary battery case.

However, when a secondary battery is charged or discharged, the layered spiral arrangement type electrode assembly is deformed due to repeated expansion and shrinkage. For example in this procedure, stress is focused on the center and the electrodes pierce into the separator and contact the metallic center pin which causes an internal short circuit. The heat generated by the internal short circuit decomposes an organic solvent within the battery to generate gas and increases the pressure within the battery, thereby leading to the rupture of the battery. The pressure within the battery increases due to internal short circuit caused by an external impact.

In order to resolve the safety-related problems of a battery, the cap assembly of cylindrical batteries has a structure in which safety devices such as a safety vent for discharging a high-pressure gas, a PTC element for interrupting an electric current at a high temperature and a current interrupt device (CID) for interrupting an electric current when the inner pressure of the battery increases, a top cap for protecting the safety devices, etc. are fixed by a gasket.

In particular, according to a method for coupling a metal can and a cap assembly used for conventional cylindrical batteries, the cap assembly and the can are brought into close contact with each other and then clamped. However, in the metal container according to the conventional structure, the surface thereof that contacts the gasket has a simple flat shape. Accordingly, when the degree of bending during the clamping process is increased to improve the sealing ability, the gasket interposed between the metal container and the cap assembly is damaged. Conversely, when the degree of bending is set too small in order to prevent this problem, the sealing ability deteriorates. In other words, when the degree of bending is insufficient, leakage of an electrolyte occurs. Therefore, there is a high need for a technique capable of effectively maintaining the sealing ability while preventing damage to the gasket.

The above information disclosed in this section is merely for enhancement of understanding of the background of the disclosure and therefore it may contain information that does not form the prior art that is already known in this country to a person of ordinary skill in the art.

SUMMARY

An aspect of the present disclosure provides a cylindrical battery cell that may include an electrode assembly of a cathode/separator/anode structure and an electrolyte disposed in a battery case. The battery case may include a cylindrical metal container having the electrode assembly and the electrolyte are accommodated therein, a cap assembly may be disposed on the open upper end of the metal container and a gasket of an elastic material may be interposed between the metal container and the cap assembly. The upper end of the metal container may be clamped to bend inward toward a central axis of the battery cell to enable the upper portion of the metal container to surround the exterior surface of the gasket. A recessed groove configured to receive partial insertion of the gasket by clamping, may be formed on the interior surface of the inward-bent portion of the metal container.

In an exemplary embodiment, the elastic material of the gasket may include at least one selected from the group consisting of polyethylene, polypropylene, polyimide, natural rubber, and synthetic rubber. Thus, the gasket portion at a position corresponding to the groove may be elastically inserted into the groove when the upper end of the metal container is clamped toward the central axis of the battery cell to surround the exterior surface of the gasket after the metal container is brought into close contact with the gasket. Accordingly, the sealing ability is further improved.

The vertical cross-section shape of the groove is not particularly limited. However, in order to minimize damage to the gasket of an elastic material and effectively inhibit the leakage of an electrolyte, etc., the groove disposed on the interior surface of the metal container of the cylindrical battery cell may have a semicircular shape, a triangular shape, or a quadrangular shape. In some exemplary embodiments, the groove may be formed continuously or discontinuously along the interior surface of the metal container.

In some exemplary embodiments, a plurality of grooves may be formed at positions spaced apart from each other. In an exemplary embodiment, the groove may be additionally formed on the interior surface of the portion of the metal container which is not bent inward, in addition to the interior surface of the portion thereof that may be bent inward. In an exemplary embodiment, the groove may be formed about 1 mm to about 10 mm apart from an end of the metal container. Additionally, the groove may be formed to a depth of about 0.05 mm to about 0.5 mm.

In some exemplary embodiments, an adhesive comprising a polymer resin may be further applied to the interface between the interior surface of the metal container and the gasket of an elastic material and/or the groove. In one embodiment, a protrusion portion in a shape complementary to that of a groove of the metal container may be formed in the gasket portion at a position that corresponds to the groove. The vertical cross-section shape of the protrusion portion may have a semicircular shape, a triangular shape, or a quadrangular shape. Also, the metal container and the gasket may be coupled to each other more strongly due to the shape of the groove of the metal container which is complementary to that of the protrusion portion of the gasket.

The present invention also provides a battery pack that may include at least one of the battery cells and a device comprising the battery pack as a power source. The device may be selected from a cell phone, a portable computer, a smart phone, a smart pad, a netbook, a wearable electronic device, a light electronic vehicle (LEV), an electric vehicle, a hybrid electric vehicle, a plug-in hybrid electric vehicle, and a power storage apparatus. The structure of the battery pack and the device and a manufacturing method thereof are well known in the art, and thus a detailed description thereof is omitted herein. For reference, the battery cell may be a lithium ion battery or a lithium secondary battery, although of course not limited thereto. The lithium secondary battery may include a cathode, an anode, a separator, and a non-aqueous electrolyte containing a lithium salt.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION

Figure 1:
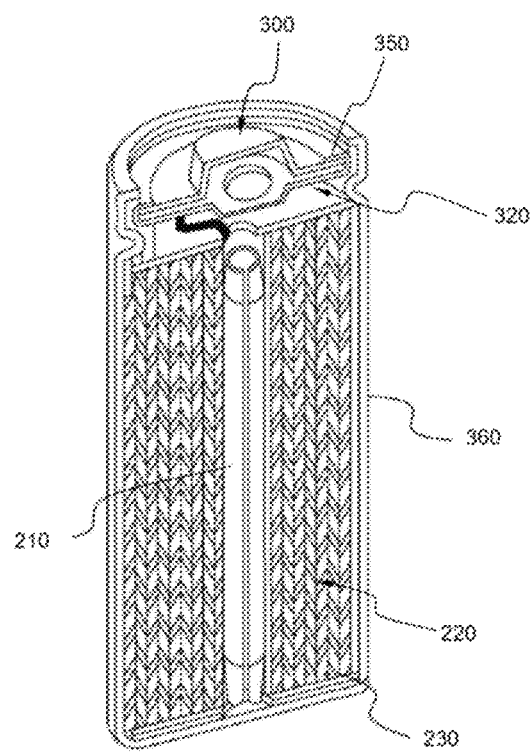
FIG. 1 is an exemplary schematic vertical cross-sectional view of a cylindrical battery cell according to the related art.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As a result of a variety of extensive and intensive studies and experiments to solve the problems as described above, the inventors of the present application have found that, in the case where a recessed groove is formed on the interior surface of the inward-bent portion of the metal container constituting the cylindrical battery cell, damage to the gasket interposed between the metal container and the cap assembly is significantly reduced and deterioration of the characteristics of the secondary battery, including the leakage of an electrolyte itself and the increase of the internal resistance due to the inflow of air and/or moisture from the outside can be prevented. The present disclosure has been completed based on these findings.

Figure 2:
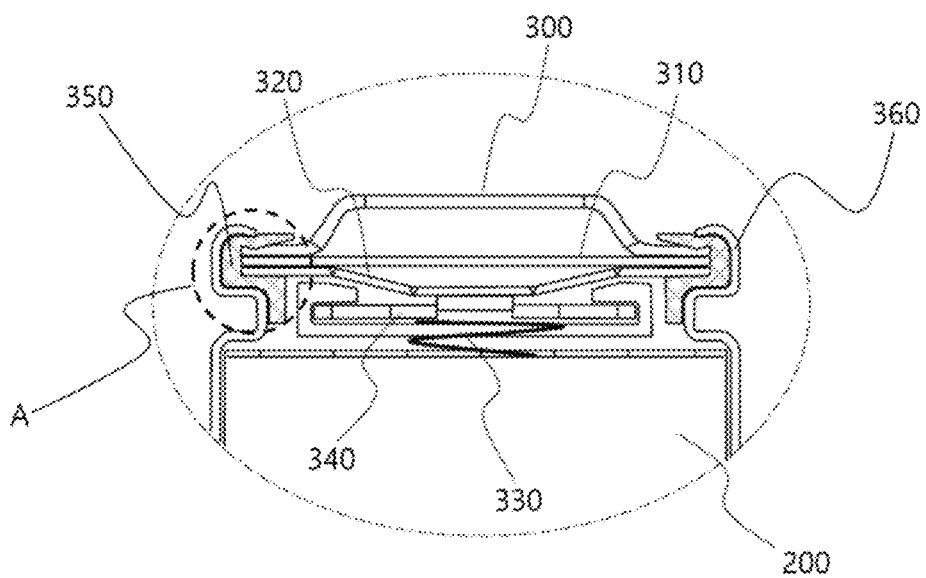
FIG. 2 is an exemplary cross-sectional perspective view of a cylindrical battery cell according to the related art.

FIG. 1 is an exemplary schematic vertical cross-sectional view of a cylindrical battery cell according to the related art. FIG. 2 is an exemplary cross-sectional perspective view of a cylindrical battery cell according to the related art. With reference to both FIG. 1 and FIG. 2, the cylindrical battery cell includes a cylindrical metal container 360 that receives both an electrolyte and an electrode assembly 200 having a structure in which a separator is interposed between a cathode and an anode and a cap assembly that seals the open end of the cylindrical metal container 360. With reference to FIG. 1 and FIG. 2, a cylindrical secondary battery is manufactured by inserting a jelly-roll type electrode assembly 200 accommodated in a metal container 360 as a power generation element, injecting an electrolyte and mounting a cap assembly on the top opening of the metal container 360. The electrode assembly 200 has a structure in which a cathode, an anode and a separator interposed therebetween are wound into a jelly-roll type. The cathode is attached to a cathode tab 330, which is connected to the cap assembly. The anode is attached to an anode tab, which is connected to the lower end of the container.

In the cylindrical battery cell, the cylindrical metal container 360 is made of a lightweight conductive metal material, and has a cylindrical structure having an opening portion with an open upper end and a sealed bottom portion opposite thereto. The electrode assembly 200 and an electrolyte (not shown) are contained in the interior space of the metal container. The electrode assembly 200 accommodated in the metal container 360 comprises two sheet-like electrode plates 220 and 230 having different polarities and a separator interposed therebetween to insulate the electrode plates from each other.

A cathode tab 330 attached to the upper end of the electrode assembly 200 is electrically connected to the cap assembly and an anode tab (not shown) attached to the lower end of the electrode assembly 200 is connected to the bottom of the metal container 360. In the cylindrical battery cell, the cap assembly is located at the open end of the metal container 360, and a gasket 350 of an elastic material is interposed between the metal container 360 and the cap assembly. The upper portion of the metal container 360 is clamped in a manner such that the end thereof is bent inward toward the central axis of the battery cell so that the upper portion surrounds the exterior surface of the gasket 350, which allows to seal the metal container 360 and the cap assembly while they are sealed.

A cap plate 300 shown in FIG. 2, which has a protruding shape, forms a cathode terminal and includes an exhaust opening formed therein. A positive temperature coefficient (PTC) element 310 for interrupting an electric current by allowing the battery resistance to increase significantly when the temperature within the battery rises, a safety vent 320 which protrudes downward in a normal state and that protrudes and ruptures to discharge gas when the pressure within the battery rises, and a connection plate 340 a portion of the upper end of which is connected to the safety vent 320 and a portion of the lower end of which is connected to the cathode of the electrode assembly 200 are disposed in this order below the cap plate 300.

Further, the cap assembly includes a top cap 300 forming a cathode terminal, a positive temperature coefficient (PTC) element 310 for interrupting an electric current by allowing the battery resistance to significantly increase when the temperature within the battery rises, a safety vent 320 for interrupting an electric current and/or discharging gas when the interior pressure of the battery increases, a gasket 350 for electrically isolating the safety vent 320 except a specific portion from the cap plate 300 and sealing the inside of the battery, and a terminal plate 340 to which the cathode tab 330 attached to the cathode is connected. The center of the the top cap 300 protrudes upward to serve as a cathode terminal through connection with an external circuit. Also, a plurality of apertures are formed in the top cap 300 300 in order to discharge gas. The lower end portion of the safety vent 320 is electrically connected to the electrode assembly 200 through the current interrupt device 340 and the cathode tab 330.

That is, conventional cap assemblies are manufactured by interposing a gasket within a metal container, inserting a safety vent, a PTC device, a CID, and a top cap into the container and then clamping them and thereby prevent the leakage of an electrolyte and gases generated within the battery. However, this structure alone cannot ensure a sufficiently close contact between the metal container and the cap assembly. Accordingly, when the interior pressure of the battery increases, a complete sealing structure is not formed. Thus, a part of the electrolyte may leak substantially due to the charging and discharging process of the battery, falling, an impact from the outside, etc. Further, the leakage of an electrolyte may lead to a leak of gases generated in the battery through the interface between the metal container and the gasket.

In particular, according to an exemplary embodiment of the present disclosure for coupling a metal container and a cap assembly used for conventional cylindrical batteries, the cap assembly and the container are brought into close contact with each other, and then clamped such that the end of the metal container is bent inward toward the central axis of the battery cell so that the upper portion of the metal container surrounds the exterior surface of the gasket. However, in the metal container according to the conventional structure, the surface thereof that comes into contact with the gasket has a simple flat shape. Thus, when the degree of bending during the clamping process is increased in order to improve the sealing ability, the gasket interposed between the metal container and the cap assembly may be damaged. On the other hand, when the degree of bending is set too small in order to prevent this problem, the sealing ability deteriorates. Thus, when the degree of bending is not appropriate, there is a problem of leakage of an electrolyte, etc. Therefore, there is a high need for a technique capable of effectively maintaining the sealing ability while preventing damage to the gasket.

Figure 3:
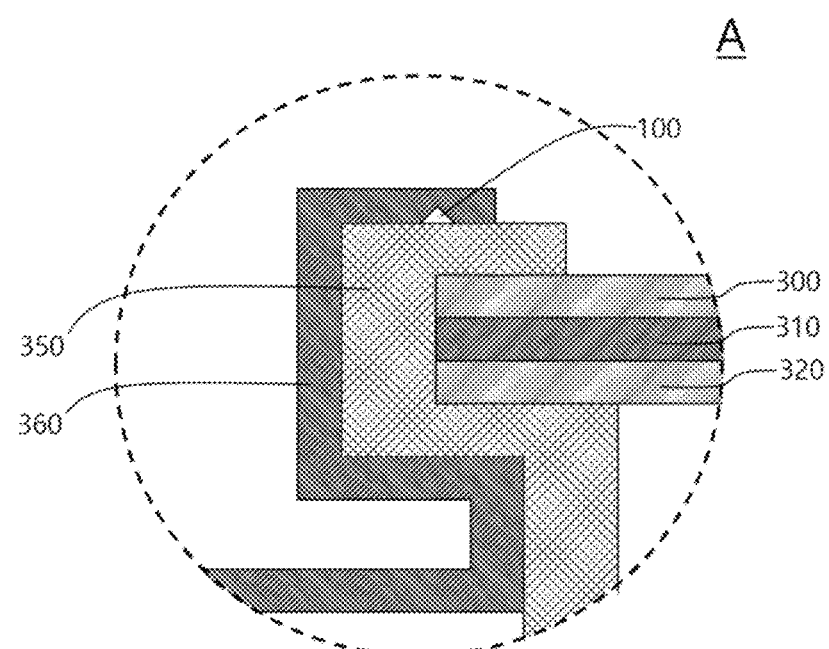
FIG. 3 is an exemplary exploded view showing a cylindrical battery cell in which a triangular groove is formed on the interior surface of the upper end of the metal container according to an exemplary embodiment of the present disclosure.
Figure 4:
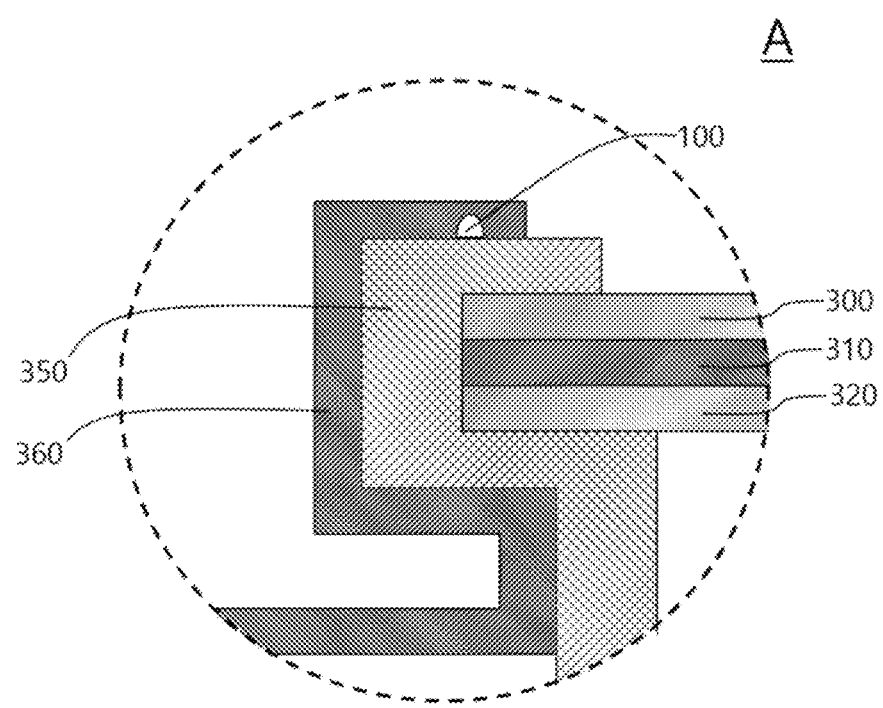
FIG. 4 is an exemplary exploded view showing a cylindrical battery cell disclosure in which a semicircular groove is formed on the interior surface of the upper end of the metal container according to an exemplary embodiment of the present disclosure.
Figure 5:
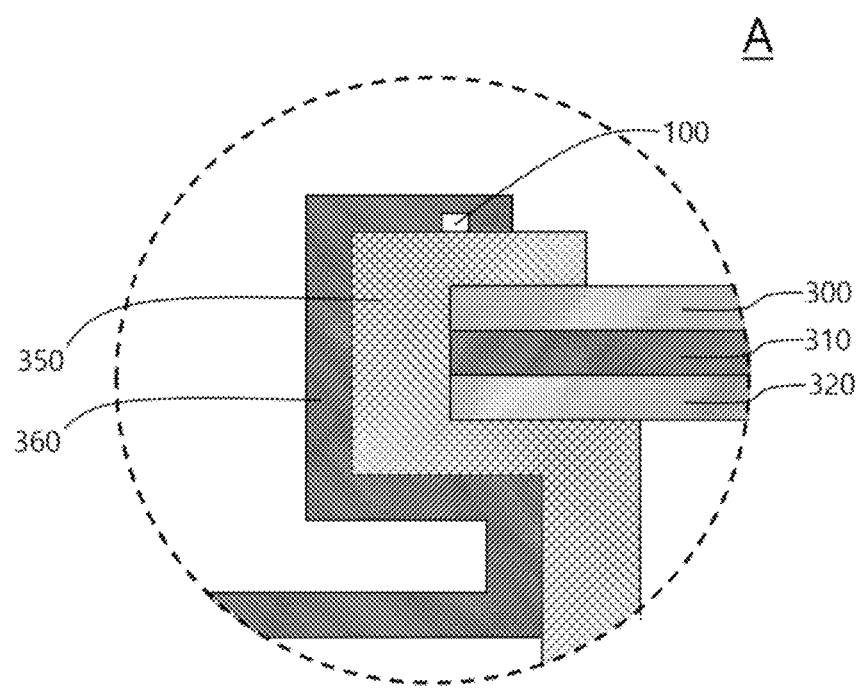
FIG. 5 is an exemplary exploded view showing a cylindrical battery cell in which a quadrangular groove is formed on the interior surface of the upper end of the metal container according to an exemplary embodiment of the present disclosure.
Figure 6:
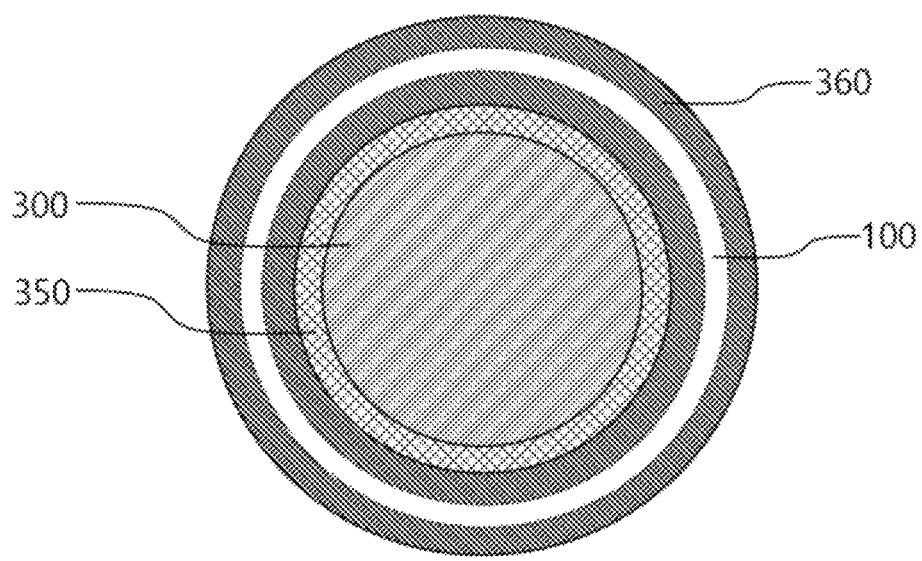
FIG. 6 is an exemplary plan view showing a cylindrical battery cell in which grooves are continuously formed on the interior surface of the upper end of the metal container according to an exemplary embodiment of the present disclosure.
Figure 7:
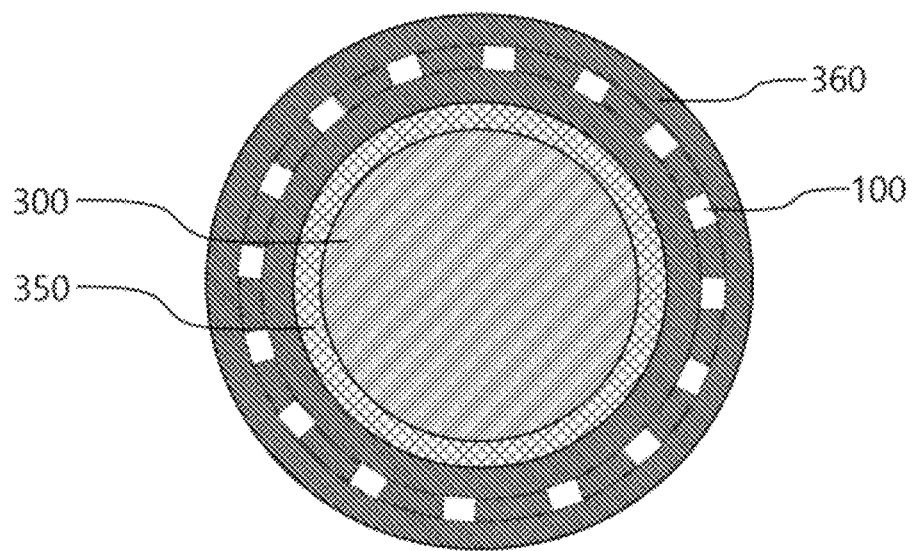
FIG. 7 is an exemplary plan view showing a cylindrical battery cell in which grooves are discontinuously formed on the interior surface of the upper end of the metal container according to an exemplary embodiment of the present disclosure.

FIG. 3 is an exemplary exploded view showing a cylindrical battery cell according to an exemplary embodiment of the present disclosure in which a triangular groove is formed on the interior surface of the upper end of the metal container. FIG. 4 is an exemplary enlarged view in which a semicircular groove may be formed. FIG. 5 is an exemplary enlarged view in which a quadrangular groove may be formed. FIG. 6 and FIG. 7 respectively are exemplary plan views showing a cylindrical battery cell according to an exemplary embodiment of the present disclosure in which grooves may be continuously or discontinuously formed on the interior surface of the upper end of the metal container.

In order to facilitate understanding of the structure, the grooves are shown as empty spaces in the drawings. However, during the clamping process, the gasket portion at a position corresponding to a groove of the metal container may be elastically inserted into the groove. The gasket inserted into the groove may have a structure that fills the entire interior of the groove, but in some cases, it may have a structure that fills a portion of the interior of the groove. The structure may depend on the size of the groove, the degree of clamping, the material of the gasket, etc.

Therefore, in the cylindrical battery cell according to the present disclosure, which includes the recessed groove formed inside the metal container, the groove disperses the stress applied to the gasket facing the metal container during a clamping process. Thus, the metal container and the gasket container are brought into close contact with each other without damage to the gasket. Additionally, even even when the degree of bending of the metal container is minimized, it is possible to effectively inhibit the leakage of an electrolyte, etc. because the groove provides a large contact area between the metal container and the gasket to serve as a kind of stopper and thus to enhance the sealing ability. For example, the clamping process is a process of bending the metal container inward by applying pressure to the upper end of the opening of the cylindrical metal container while the gasket is mounted on the exterior periphery of the cap assembly. The gaps among the metal cap, the gasket and the cap assembly are sealed through this clamping process. In the process of bending the metal container for clamping, the gasket portion at a position corresponding to the groove of the metal container may be elastically inserted into the groove.

As shown in FIG. 3 to FIG. 7, a groove 100 having a triangular shape, a semicircular shape, or a quadrangular shape may be formed on the interior surface of the inward-bent portion of the metal container 360. The groove 100 may disperse the stress applied to the bent portion of the metal container 360 during the clamping process for sealing the metal container 360 and the cap assembly. Accordingly, the metal container and the gasket may abut (e.g., to be brought into close contact with each other) without damage to the gasket 350.

In an exemplary embodiment, the groove may be formed 1 mm to 10 mm apart from an end of the metal container. When the distance from an end of the metal container is less than 1 mm, the groove cannot effectively disperse the stress applied to the gasket, which may result in damage to the gasket. When the distance distance exceeds 10 mm, the groove is not located on the upper surface of the gasket, and thus it may be difficult to exhibit the desired effect. Additionally, the groove may be formed to a depth of 0.05 mm to 0.5 mm. When the depth of the groove is less than 0.05 mm, the desired effect cannot be sufficiently achieved. When the depth exceeds 0.5 mm, the thickness of the portion of the metal container where the groove is formed is too thin relative to the other portions and thus are vulnerable to an impact from the outside or an increase in the interior pressure, etc., leading to a risk of rupture of the metal container itself. Also, the groove increases the contact area between the metal container and the gasket, serving as a kind of stopper and thus enhancing the sealing ability, which leads to the effect of inhibiting the leakage of an electrolyte, etc.

Figure 8:
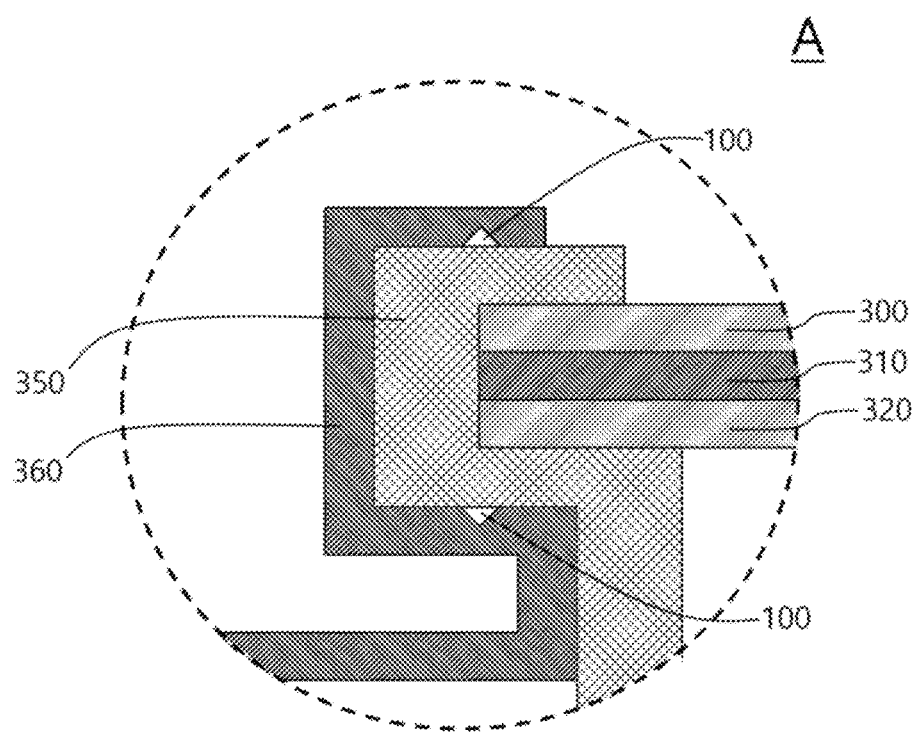
FIG. 8 is an exemplary exploded view showing a cylindrical battery cell in which a triangular groove is formed on each of the interior surface of the upper end of the metal container which is bent inward and the interior surface of the portion thereof which is not bent inward according to an exemplary embodiment of the present disclosure.

FIG. 8 is an exemplary exploded view showing a cylindrical battery cell according to an exemplary embodiment of the present disclosure in which a triangular groove is formed on each of the interior surface of the upper end of the metal container which is bent inward and the interior surface of the portion thereof which is not bent inward. As shown in FIG. 8, the metal container 360 of the cylindrical battery cell according to the present disclosure may have a plurality (e.g., at least two grooves) 100 formed at positions spaced from each other. In an exemplary embodiment, the grooves 100 may be formed on the upper surface of the gasket 350 interposed between the metal container 360 and the cap assembly and also on the lower surface of the gasket 350 where a beading portion is formed. The additional groove allows to more effectively dispersing the stress applied to the gasket 350, thus more effectively preventing the damage to the gasket and enhancing the sealing ability. Due to the additional groove, the stress applied to the gasket is more effectively dispersed and a larger contact area is provided between the metal container and the gasket, which allows significant enhancement of the effect of preventing damage to the gasket and leakage of an electrolyte, etc.

In some exemplary embodiments, an adhesive comprising a polymer resin may be further applied to the interface between the interior surface of the metal container and the gasket of an elastic material and/or the groove. This configuration allows the coupling of the metal container and the gasket by clamping along with adhesion by the adhesive. The coupling configuration enables to more effectively prevent the separation of the metal container from the cap assembly resulting from a physical impact applied from the outside, etc.

Figure 9:
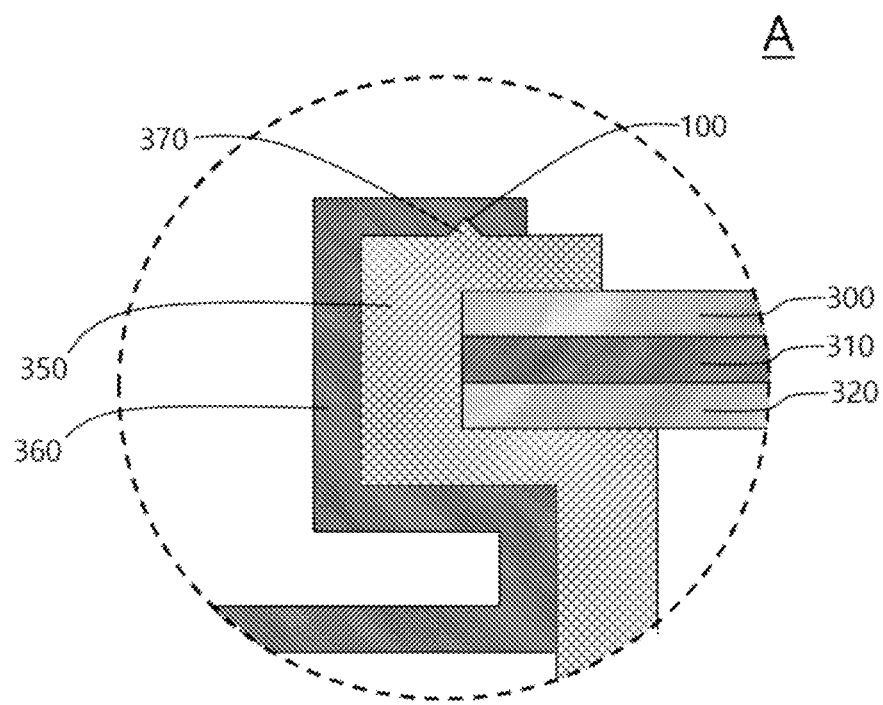
FIG. 9 is an exemplary exploded view showing a cylindrical battery cell in which a protrusion portion in a shape complementary to that of a groove of the cylindrical battery cell is formed on a gasket portion at a position corresponding to the groove according to an exemplary embodiment of the present disclosure.

FIG. 9 is an exemplary exploded view showing a cylindrical battery cell according to an exemplary embodiment of the present disclosure in which a protrusion portion in a shape complementary to that of a groove of the cylindrical battery cell may be formed on a gasket portion at a position corresponding to the groove. As shown in FIG. 9, a recessed groove 100, configured to receive partial insertion of the gasket 350 by clamping, may be formed on the inward-bent portion of the metal container 360. Additionally, a protrusion portion 370 in a shape complementary to that of the groove 100 may be formed in a gasket 350 portion at a position that corresponds to the groove 100. The complementary coupling between the groove 100 and the protrusion portion 370 may resulted in improved coupling strength. Accordingly, the sealing ability may be improved and thereby to more effectively prevent the leakage of an electrolyte, etc. Further, when the size of the groove is relatively small, when the degree of clamping is relatively small, or when the gasket is made of a relatively rigid material, the gasket portion may be inserted into the groove.

As described above, in the cylindrical battery cell according to the present disclosure, the upper end of the metal container may be clamped to bend inward toward the central axis of the battery cell and a recessed groove may be formed on the interior surface of the metal container. Accordingly, the groove may reduce damage to the gasket interposed between the metal container and the cap assembly and the leakage of an electrolyte may be inhibited, which leads to prevention of deterioration of the characteristics of the secondary battery and thus resolution of safety problems.

While the disclosure has been described with reference to the drawings according to the embodiments thereof, it will be understood by those skilled in the art that various changes and modifications may be made based on the descriptions given herein without departing from the scope of the disclosure.

What is claimed is:

1. A cylindrical battery cell comprising:
a battery case, wherein an electrode assembly of a cathode, a separator and an anode structure and an electrolyte are disposed within the battery case;
a cylindrical metal container forming the battery case;
a cap assembly mounted on an open upper end of the metal container; and
a gasket of an elastic material interposed between the metal container and the cap assembly, the elastic material of the gasket including at least one material selected from the group consisting of polyethylene, polypropylene, polyimide, natural rubber, and synthetic rubber,
wherein the upper end of the metal container is clamped to form an inward-bent portion that is bent inward toward a central axis of the battery cell to enable the upper end of the metal container to surround an exterior surface of the gasket,
wherein the inward-bent portion of the metal container includes a groove is formed as a recess that is cut into an interior surface of the inward-bent portion, such that the groove is defined between a first convex corner and a second convex corner formed on the interior surface of the inward-bent portion, the first convex corner being disposed at a radially outer side of the groove and the second convex corner being disposed at a radially inner side of the groove,
wherein a radial width of the groove is narrower than a radial width of the inward-bent portion, and
wherein a surface portion of the gasket at a radial position corresponding to the groove is flat in an undeformed state, such that, upon clamping the upper end of the metal container, the elastic material of the surface portion of the gasket at the radial position deforms convexly so as to be received within the groove.

2. The cylindrical battery cell according to claim 1, wherein a vertical cross-section shape of the groove is semicircular, triangular or quadrangular.

3. The cylindrical battery cell according to claim 1, wherein the groove is formed continuously along an entire circumference of the interior surface of the metal container.

4. The cylindrical battery cell according to claim 1, wherein the grooves include a plurality of partial grooves formed at positions circumferentially spaced apart from each other.

5. The cylindrical battery cell according to claim 1, wherein the groove is formed about 1 mm to about 10 mm apart from an end of the metal container.

6. The cylindrical battery cell according to claim 1, wherein the groove is formed to a depth of about 0.05 mm to about 0.5 mm.

7. The cylindrical battery cell according to claim 1, wherein an adhesive is applied to the groove.

8. The cylindrical battery cell according to claim 1, wherein an additional groove is formed on an interior surface of the metal container at a position other than the inward-bent portion.

9. A cylindrical battery cell comprising:
a battery case, wherein an electrode assembly of a cathode, a separator and an anode structure and an electrolyte are disposed within the battery case;
a cylindrical metal container forming the battery case;
a cap assembly mounted on an open upper end of the metal container; and
a gasket of an elastic material interposed between the metal container and the cap assembly, the elastic material of the gasket including at least one material selected from the group consisting of polyethylene, polypropylene, polyimide, natural rubber, and synthetic rubber,
wherein the upper end of the metal container is clamped to form an inward-bent portion that is bent inward toward a central axis of the battery cell to enable the upper end of the metal container to surround an exterior surface of the gasket, the inward-bent portion having a thickness,
wherein the inward-bend portion of the metal container includes a groove is formed as a recess that is cut into an interior surface of the inward-bent portion, such that the thickness of the inward-bent portion in a region of the inward-bent portion containing the groove is less than the thickness of the inward-bent portion in a region of the inward-bent portion not containing the groove,
wherein a radial width of the groove is narrower than a radial width of the inward-bent portion, and wherein a surface portion of the gasket at a radial position corresponding to the groove is flat in an undeformed state, such that, upon clamping the upper end of the metal container, the elastic material of the surface portion of the gasket at the radial position deforms convexly so as to be received within the groove.

10. The cylindrical battery cell according to claim 9, wherein a vertical cross-section shape of the groove is semicircular, triangular or quadrangular.

11. The cylindrical battery cell according to claim 9, wherein the groove is formed continuously along an entire circumference of the interior surface of the metal container.

12. The cylindrical battery cell according to claim 9, wherein the groove is formed about 1 mm to about 10 mm apart from an end of the metal container.

13. The cylindrical battery cell according to claim 9, wherein the groove is formed to a depth of about 0.05 mm to about 0.5 mm.

14. The cylindrical battery cell according to claim 9, wherein an adhesive is applied to the groove.

15. The cylindrical battery cell according to claim 9, wherein an additional groove is formed on an interior surface of the metal container at a position other than the inward-bent portion.

16. A cylindrical battery cell comprising:
a battery case, wherein an electrode assembly of a cathode, a separator and an anode structure and an electrolyte are disposed within the battery case;
a cylindrical metal container forming the battery case;
a cap assembly mounted on an open upper end of the metal container; and
a gasket of an elastic material interposed between the metal container and the cap assembly,
wherein the upper end of the metal container is clamped to form an inward-bent portion that is bent inward toward a central axis of the battery cell to enable the upper end of the metal container to surround an exterior surface of the gasket,
wherein the inward-bent portion of the metal container includes a groove formed as a recess that is cut into a planar region of an interior surface of the inward-bent portion, such that a portion of the planar region defining a radially inner side of the groove is coplanar with a portion of the planar region defining a radially outer side of the groove,
wherein a radial width of the groove is narrower than a radial width of the inward-bent portion, and
wherein a surface portion of the gasket at a radial position corresponding to the groove is flat in an undeformed state, such that, upon clamping the upper end of the metal container, the elastic material of the surface portion of the gasket at the radial position deforms convexly so as to be received within the groove.

17. The cylindrical battery cell according to claim 16, wherein a vertical cross-section shape of the groove is semicircular, triangular or quadrangular.

18. The cylindrical battery cell according to claim 16, wherein the groove is formed about 1 mm to about 10 mm apart from an end of the metal container.

19. The cylindrical battery cell according to claim 16, wherein the groove is formed to a depth of about 0.05 mm to about 0.5 mm.

20. The cylindrical battery cell according to claim 16, wherein an adhesive is applied to the groove.

\* \* \* \* \*